May 7, 1968 P. F. HAYNER ET AL 3,381,698
ADJUSTABLE PRESSURE GAIN CONTROL SERVO VALVE SYSTEM
Filed March 16, 1964 4 Sheets-Sheet 1
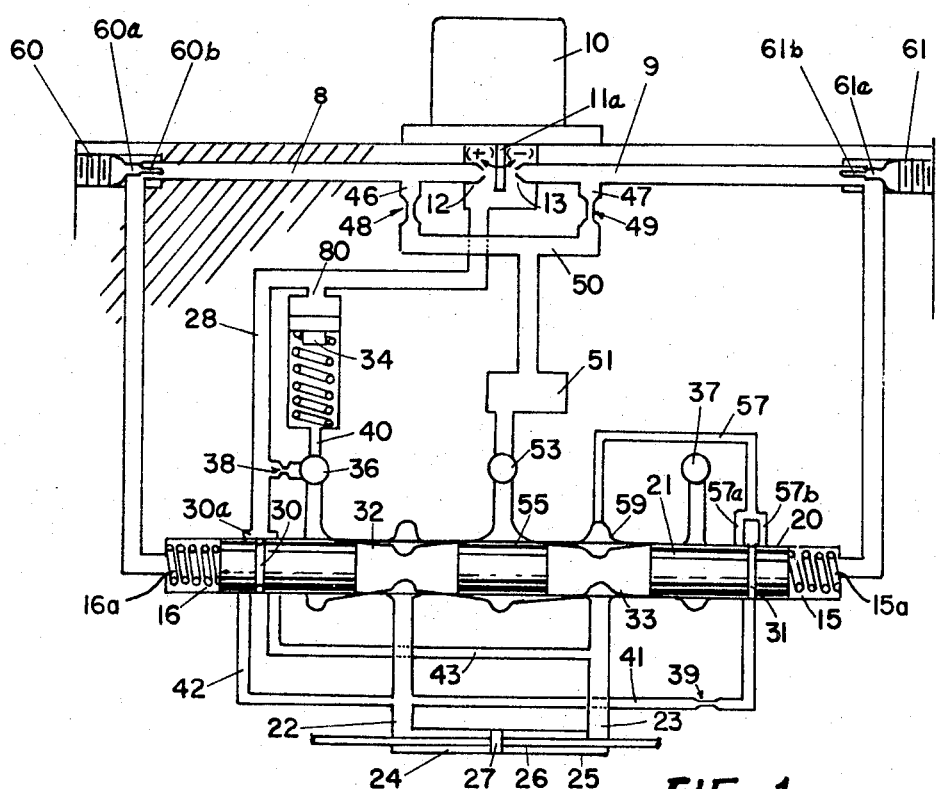
FIG. 1.
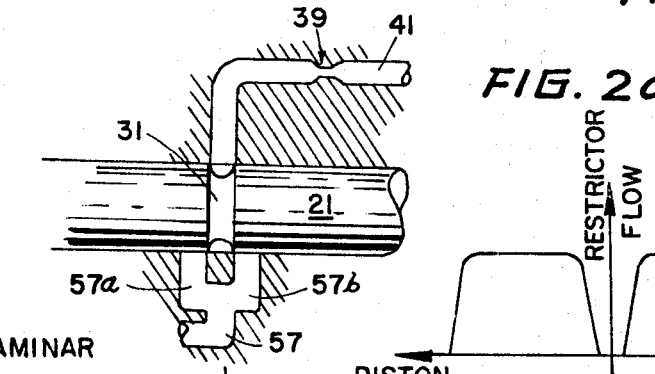
FIG. 2a.
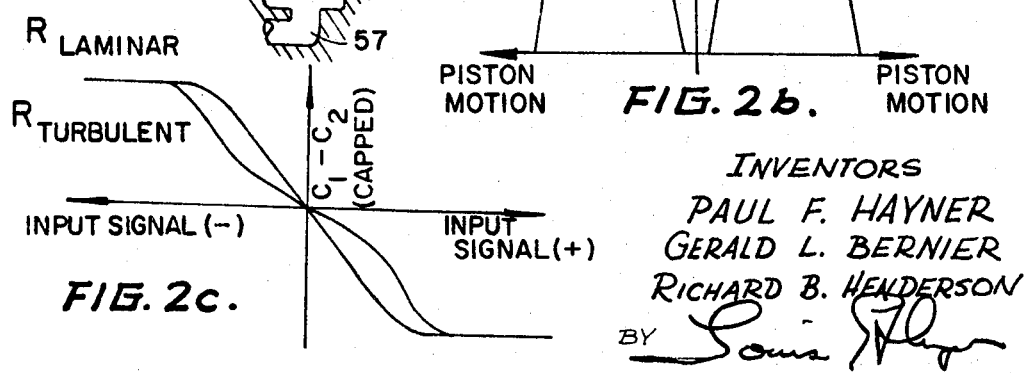
FIG. 2b.
FIG. 2c.
INVENTORS
PAUL F. HAYNER
GERALD L. BERNIER
RICHARD B. HENDERSON
BY
ATTORNEY

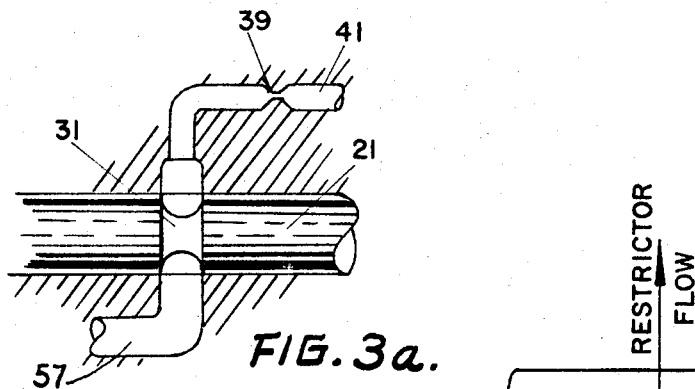
FIG. 3a.
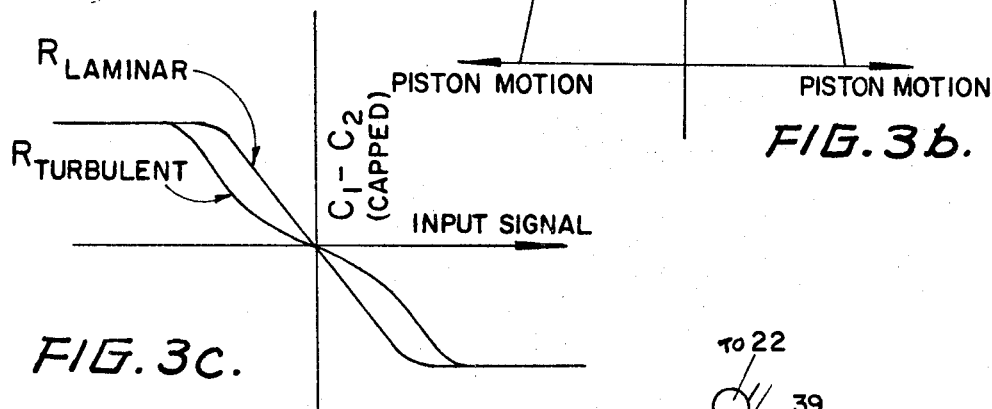
FIG. 3b.
FIG. 3c.
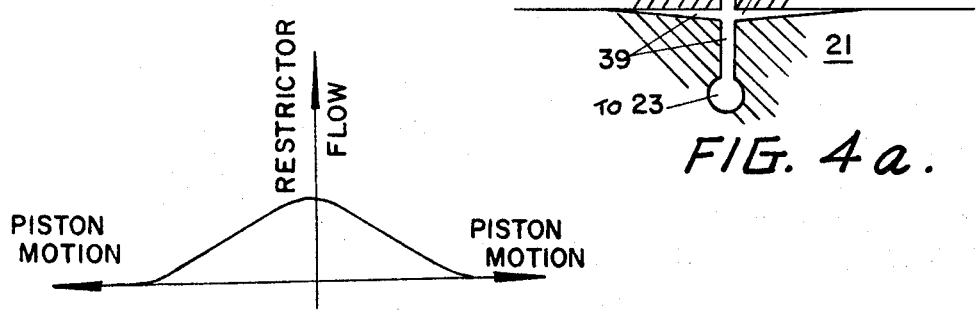
FIG. 4a.
FIG. 4b.
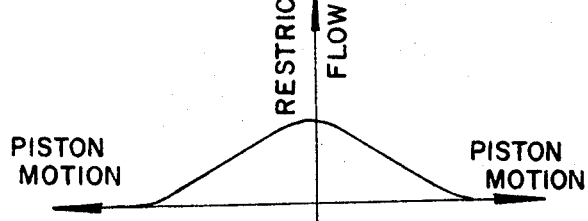
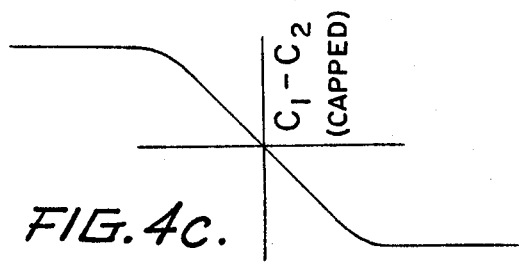
FIG. 4c.
INVENTORS
PAUL F. HAYNER
GERALD L. BERNIER
RICHARD B. HENDERSON
BY
ATTORNEY

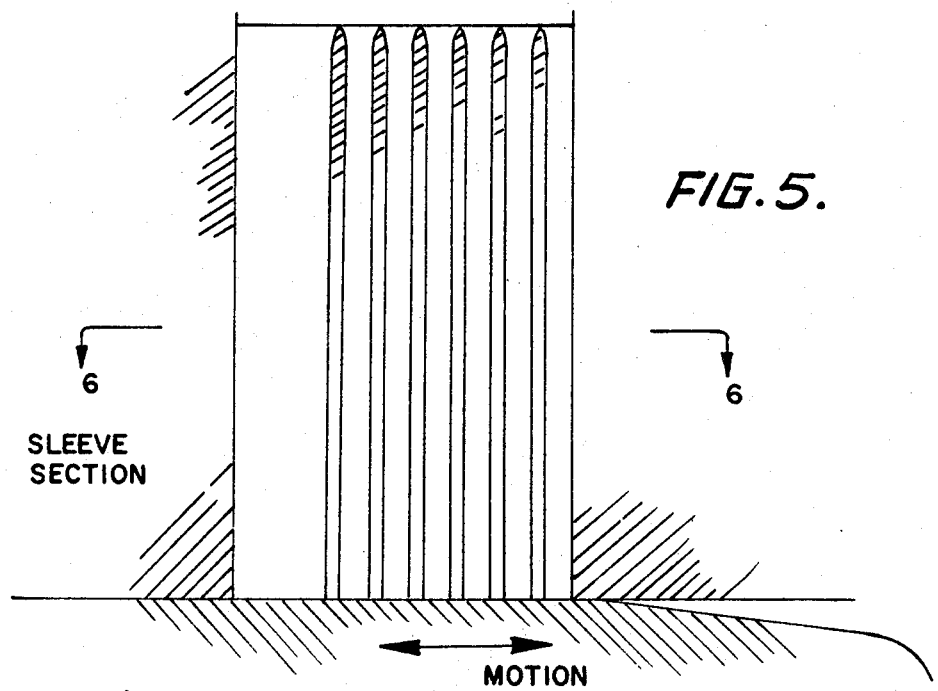
FIG. 5.
SLEEVE SECTION
MOTION
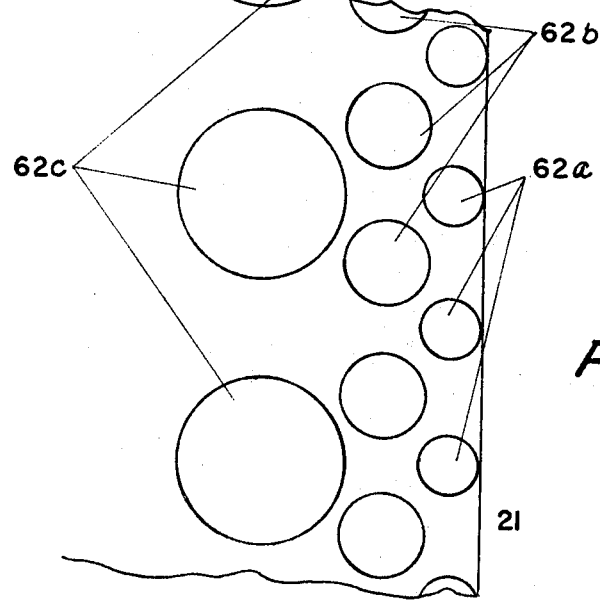
FIG. 6.
FIG. 7.
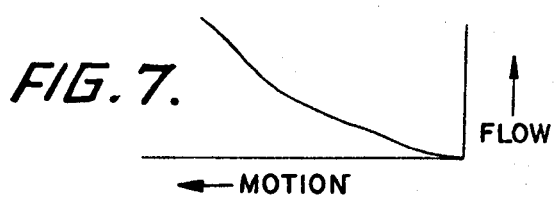
INVENTORS
PAUL F. HAYNER
GERALD L. BERNIER
RICHARD B. HENDERSON
BY
ATTORNEY May 7, 1968 P. F. HAYNER ET AL 3,381,698
ADJUSTABLE PRESSURE GAIN CONTROL SERVO VALVE SYSTEM
Filed March 16, 1964 4 Sheets-Sheet 4

INVENTORS
PAUL F. HAYNER
GERALD L. BERNIER
RICHARD B. HENDERSON
BY
ATTORNEY

United States Patent Office 3,381,698
Patented May 7, 1968

3,381,698
ADJUSTABLE PRESSURE GAIN CONTROL SERVO VALVE SYSTEM
Paul F. Hayner, Lexington, and Gerald L. Bernier, Lawrence, Mass., and Richard B. Henderson, Nashua, N.H., assignors to Sanders Associates, Inc., Nashua, N.H., a corporation of Delaware
Filed Mar. 16, 1964, Ser. No. 352,246
17 Claims. (Cl. 137—85)

This invention relates to servo valves, and more particularly to and adjustable pressure gain control for such valves, employing fluid (usually a liquid) under pressure.

In apparatus heretofore employed for the purpose of our invention, there was little or no adjustability for control of pressure gain, which changed with wear on the parts, and the actuator could drift and required constant correction by a valve or valves, resulting in an unduly complicated system and operation. Other difficulties with heretofore known apparatus were their non-linearity and their high leakage rates.

According to our invention, these difficulties are eliminated or substantially reduced; the pressure gain is adjustible and is substantially independent of wear of the parts, there is no actuator drift at null, and constant correction by valves or other means is not required. In addition, this invention provides linearity with orifice-type valves, and substantially reduces the leakage rates encountered with heretofore known apparatus. Our invention contemplates the inclusion of a separate and adjustable restrictor, either laminar or turbulent (orifice-type), connecting the control ports and using the piston motion to determine pressure gain characteristic.

It is an object of this invention to provide improved apparatus of the type described which eliminates or substantially reduces the difficulties encountered with apparatus heretofore used for the purpose, and which gives control of output pressure vs. input signals with control ports capped (equivalent to infinite load).

It is a further object of this invention to provide apparatus having pressure gain adjustability, relatively little or no gain change due to wear of the parts, substantially no actuator drift at null, linearity with orifice-type valves, and relatively low leakage rates.

It is a further object of this invention to provide apparatus of the class described, in which the restrictor may be placed in some accessible location for easy external adjustment, and which will be reliable in operation, provide high performance, and relatively quiet operation, freedom from "water hammer" when the valve is opened, and freedom from noise caused by sudden and steep pressure pulses going through the system.

It is a further object of this invention to provide, in apparatus of the class described, a new and more economical form of restrictor to obtain precise laminar flow of liquid, which can be varied to suit the desired flow output characteristics.

Still other objects and advantages of this invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawings, in which FIG. 1 is a schematic view of one form of servo valve according to this invention, shown in null or center position;

FIG. 2a is a diagrammatic view of a control with grooves arranged to provide flow shut-off at center position of the piston, according to this invention;

FIG. 2b is a curve of flow through the restrictor of FIG. 2a as ordinate vs. piston motion as abscissa;

FIG. 2c is a curve of output pressure differential $C_1$–$C_2$, with output ports capped (infinite load) as ordinate vs. input signal as abscissa for both laminar and turbulent flow;

FIG. 3a is a view similar to FIG. 2a of apparatus arranged to cut off the restrictor flow only after a certain amount of piston travel;

FIG. 3b is a curve of restrictor flow through the restrictor of FIG. 3a as ordinate vs. piston motion as abscissa;

FIG. 3c is a curve of pressure differential $C_1$–$C_2$ with output ports capped (infinite load) as ordinate vs. input signal as abscissa for both laminar and turbulent flow;

FIG. 4a is a diagrammatic view similar to FIG. 2a, but with apparatus arranged for low flow gain with a linear characteristic, giving softer actuator control with low flow builds up, so that by variation of the restrictor dimension, control pressure can be set for any desired input level;

FIG. 4b is a curve of the restrictor flow as ordinate vs. piston motion as abscissa;

FIG. 4c is a curve of pressure differential $C_1$–$C_2$, with output ports capped (infinite load) as ordinate vs. input signal as abscissa;

FIG. 5 is a sectional view of part of the piston and sleeve showing the use of a new form of laminar flow restrictor according to our invention;

FIG. 6 is a section on lines 6—6 of FIG. 5;

FIG. 7 is a curve of liquid flow as ordinate vs. piston motion as abscissa, through the restrictor of FIGS. 5 and 6;

Figure 8:
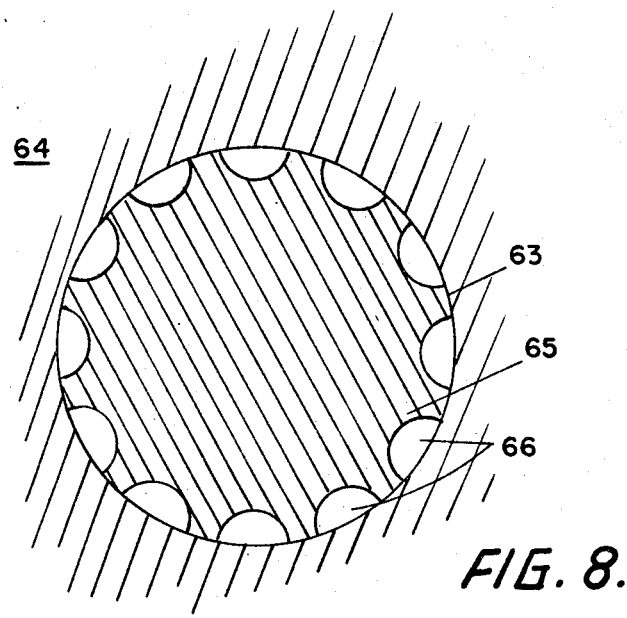
FIG. 8 is a detail section of sleeve and another form of restrictor inserted therein.

Referring now more particularly to FIG. 1, there is shown an electric dry torque motor 10 which, in response to a positive or negative electric signal, swings flapper 11a from neutral or center position to the left or right respectively, to positions adjacent control jets 12 and 13, to which liquid under pressure is supplied by conduits 8 and 9 (P$v$1 and P$v$2) respectively. Conduits 8 and 9, respectively, lead from upstream of the control jets 12 and 13 to opposite ends 16 and 15, respectively, of piston chamber 20 containing piston or spool 21, which is arranged for axial motion to control the flow of liquid in the system from main supply conduit 53 to load conduits 22 and 23, and from the latter to return conduits 36 and 37. The null position of piston 21 may be adjusted by providing threaded inserts or blocks (not shown) bearing against the outer ends of springs 15a and 16a, by means of which the compression on springs 15a and 16a may be controlled.

The "flapper" type of valve 11a, driven by "dry" torque motor 10, controlling jets 12 and 13 and fed by conduits 8 and 9 leading from the control jets to opposite ends 15 and 16 of the control spool or piston chamber 20, is described in the copending application of Paul F. Hayner and Gerald L. Bernier, assigned to the assignee of this application, and constitutes a hydraulic amplifier; said copending application bears Ser. No. 306,854, filed Sept. 5, 1963, and entitled, "Hydraulic Servo Control System." While FIG. 1 is shown with an electric dry torque motor, the invention is applicable with any first stage hydraulic amplifier such as the spool or any other type. All that is required is that a controlled source of fluid pressure be supplied to the ends 15 and 16 of the piston chamber 20 of piston 21.

Load conduits 22 and 23 ($C_1$ and $C_2$) lead respectively from piston chamber 20 to opposite sides of the output ram 26, the piston 27 of which is shown diagrammatically, for driving a load, which may, for example, be a ship's rudder, a submarine's diving planes, etc.

The control piston or spool 21 is provided at one end with a circumferential switching groove 30, and at the other end with a second circumferential groove 31. Pilot pressure return conduit 28 leads from the chamber of flapper valve 11a to port 30a at the left end of piston chamber 20, permitting liquid to flow through piston groove 30 from conduits 22 or 23 when spool 21 is off-center. Pilot return conduit 28 also communicates with the top of accumulator chamber 80, within which is spring biased piston 34. Adjacent the left end of piston chamber 20, conduit 28 joins main return conduit 36 through return restrictor 38. Main return conduit 36 connects to piston chamber 20 adjacent piston groove 30, and through conduit 40 to the lower end of accumulator chamber 80. Return conduit 37 connects to piston chamber 20 adjacent piston groove 31.

We connect load conduits 22 and 23 together when, *and only when*, there is a signal to the valve 11a. This connection is via a restrictor 39 in conduit 41, which leads from piston groove 31 in neutral positions of the spool 21, to load conduit 22. A second conduit 42 leads from near the left end of piston chamber 20 to load conduit 22. Another conduit 43 leads from load conduit 23 to the left end of piston chamber 20 adjacent piston groove 30. In the null or central position of control piston or spool 21, both conduits 42 and 43 are closed at their left ends at piston chamber 20 by piston or spool 21, so that no liquid flow can occur in conduits 42 and 43.

Pilot pressure conduits 46 and 47 lead, respectively, from conduits 8 and 9, adjacent jets 12 and 13, through restrictors 48 and 49 and join at conduit 50, which leads through filter 51, which is both mechanical and magnetic (trapping both non-magnetic and magnetic particles and reducing erosion in the system), joins the main system pressure supply line 53, which opens into piston chamber 20 centrally at 55. An additional conduit 57, the right-hand end of which is bifurcated as at 57a and 57b where it opens into spool chamber 20, leads to piston or spool chamber 20 at 59. The piston or spool 21 is provided with reduced portions 32 and 33, to permit flow of liquid when spool 21 is off-center.

In the various conduits and chambers the pressures are:

In conduit 53, the main system pressure,
In conduit 50, the pilot pressure,
In conduit 8, variable pressure No. 1 ($Pv1$),
In conduit 9, variable pressure No. 2 ($Pv2$),
In conduit 28, the pilot return pressure,
In conduit 22, output control pressure No. 1 ($C_1$),
In conduit 23, output control pressure No. 2 ($C_2$),
In conduits 36 and 37, the main return pressure.

It should be noted here that the pilot return pressure, i.e., the pressure in conduit 28, is equal to the pressure in load conduits 22 or 23 whenever there is an electrical signal to the torque motor which modifies the flapper 11a from one side or the other. It will also be observed that the pilot return pressure (in conduit 28) equals the pressure in conduit 23 ($C_2$) with a (+) signal to the valve, and equals the pressure in conduit 22 ($C_1$) with a negative signal to the valve. The terms "positive" and "negative" are used herein with the following meanings: "positive load" means a load opposing the direction of correction, and "negative load" means a load aiding the direction of correction. Positive *signal* indicates piston motion to right. Negative *signal* indicates piston motion to left.

Frequency response adjustment may be provided by threaded inserts 60 and 61, each having an inner reduced extension 60a and 61a, and a still further reduced projection 60b and 61b projecting into conduits 8 and 9 respectively, to form adjustable restrictors.

Referring now to FIGS. 5 and 6, the laminar flow restrictor comprises a group of long holes of relatively small diameter, which may be formed from a block 61 provided with longitudinal holes 62a, 62b, and 62c, which *may* be graduated in size, 62a being the smallest, 62b next larger, and 62c the largest or whatever order or size might be required to produce the desired flow characteristic. As these are successively opened to liquid flow by movement of the piston to the left in FIG. 6, holes 62a are opened first, then 62b, and finally 62c, giving increased flow with increased piston movement, as shown in FIG. 7. For clarity the piston is not shown in FIG. 6, but in closed position it covers all the holes 62a, 62b, and 62c. Movement to the left opens these holes as above explained.

Figure 9:
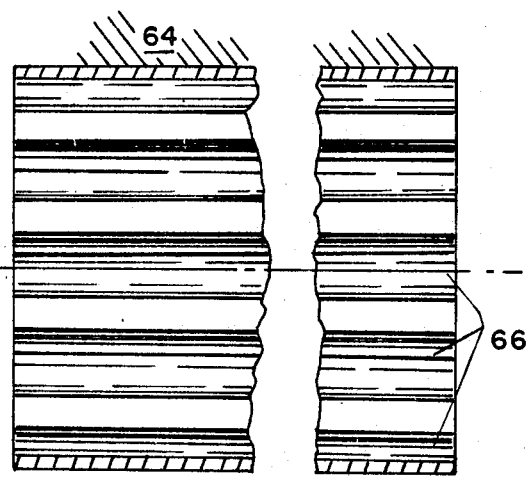
FIG. 9 is an elevation view of the cylindrical restrictor of FIG. 8.

Another form of laminar restrictor is shown in FIGS. 8 and 9. Some of the holes may be of small diameter, and to avoid machining these individually, a large hole 63 may be drilled in the valve block 64 and insert 65 fitted therein. The periphery of insert 65 may be provided with individual flutes or grooves 66. Any suitable combination or variation of holes and inserts may be used. For example, the insert 65 may be drilled and other inserts placed therein. Or on the other hand, a combination of tubes or extended forms may be utilized to act as restrictors. Such laminar restrictors may be inserted in main supply conduit at 55 where it joins piston chamber 20, and in return conduits 36 and 37 where they join piston chamber 20.

Operation of the system will now be described.

In neutral or center position of flapper 11a (zero signal to torque motor 10) and spool 21, the pilot return conduit 28 is connected only to the main system return conduit or conduits 36 (or 37) through restrictor 38, which limits the leakage to an acceptable low value. Thus, whenever there is zero signal to the valve (i.e., to torque motor 10), there is very low leakage. However, when the valve receives either a positive or negative signal, even as small as 1%, flapper 11a swings to the left or right respectively, reducing the flow in the jet toward which it moves, and increasing the flow in the jet away from which it has moved. Reduced flow from the obstructed jet increases the pressure in the conduit supplying the jet, while increased flow in the opposite jet reduces the pressure in its supply conduit.

The pilot return conduit 28 is automatically connected either to load conduit 22 or 23 by axial movement of spool or piston 21 from null (and the resultant connection of piston groove 30 to conduits 42 or 43), and the system then operates with higher leakage. This leakage is still quite low compared to the flow of liquid in load conduits 22 and 23. For center position of the main spool 21, flow in load conduits 22 and 23 is cut off, and the ram piston 27 remains in the position in which it was.

A positive signal to the motor 10 causes an increase in pressure in conduit 8 and reduction in pressure in conduit 9 as applied to opposite ends of the spool 21, which in turn moves spool 21 to the right, connecting main system pressure conduit 53 through piston reduced portion 32 to load conduit 22, and actuating ram piston 27 in the positive direction (to the right). Such movement of the spool also opens load conduit 23 to return conduit 37, through reduced piston portion 33 to permit flow of liquid from the right side of ram piston 27 to the system return.

Spool movement to the right connects load conduit 23 to pilot return conduit 28, through conduit 43 and piston groove 30.

A negative signal applied to motor 10 swings flapper 11a to the right and causes an increase in pressure in conduit 9 and a reduction in pressure in conduit 8, with resultant spool movement to the left. This movement connects load conduit 23 to the main system supply conduit 53 through spool reduced portion 33, moving ram piston 27 to the left, and connects load conduit 22 to the system return conduit 36 through spool reduced portion 32, and also connects pilot return conduit 28 to load conduit 22 through piston groove 30 and conduit 42.

From the foregoing it will be seen that the pilot return pressure (in conduit 28) equals the pressure in conduit 23 with a (+) signal to the valve, and equals the pressure in conduit 22 with a (−) signal to the valve. Pilot return conduit 28 is connected through restrictor 38 to system return conduit 36 for zero signal, reducing leakage to a low value.

Variations in load pressure which can affect flow will be compensated for by variation of the differential pressure across flapper valve 11a, to produce a greater differential for positive external loads, or a smaller differential for negative external loads.

The highest pressure is that in conduit 53, the main system pressure, from which the pressures are reduced by flow of liquid through filter 51 and restrictors 48 and 49 into conduits 8 and 9, the pressures in which depend on the position of flapper 11a. In the central or null position of flapper 11a, the pressures in conduits 8 and 9 are equal, and the flow through jets 12 and 13 is equal. For neutral position of flapper 11a and spool 21, the pilot return conduit is connected only to return conduits 36 through 38, thus limiting the leakage from pilot return conduit to a relatively low value, determined by restrictor 38.

FIG. 2a shows a detailed view of our invention, in which the same reference numerals indicate the same parts as in FIG. 1. In this instance, control ports 57a or 57b in the sleeve and switching groove 31 in the piston, respectively, are arranged to provide flow shut-off at center position of piston 21, and after a desired amount of piston motion, to provide laminar or turbulent flow gain characteristics which are a function of the type and magnitude of the restrictor 39. With the arrangement of this figure, it will be seen from FIG. 2b in which restrictor flow is ordinate and piston motion is abscissa, that there is no flow at null position through restrictor 39. For a slight axial movement of the piston in either direction, flow begins and increases sharply to a maximum, remains at constant maximum value while either port 57a or 57b is open to restrictor 39 by the position of piston 21, and decreases as sharply as it rose when further piston movement closes ports 57a or 57b to restrictor 39.

FIG. 2c shows the pressure differential $C_1-C_2$ for infinite load (control ports capped) as ordinate vs. input signal (abscissa) to flapper 11a for laminar and turbulent flow, respectively, and it will be noted that in both cases the pressure differential is substantially linearly proportional to input signal until a limiting level is reached, after which the differential remains constant for further increase in input signal.

FIG. 3a shows an arrangement similar to FIG. 2a, but arranged to permit restrictor flow at central position of piston 21, which flow is cut off by predetermined movement of the piston in either direction.

In this arrangement, it will be seen from FIG. 3b, in which restrictor flow is ordinate vs. piston motion (abscissa), that restrictor flow is constant for null position of the piston and for piston motion in either direction until port $C_2$ closes, at which the restrictor flow drops sharply to zero.

FIG. 3c showing pressure differential as ordinate vs. input signal (abscissa) for both turbulent and laminar flow, is substantially the same as in FIG. 2c. From both the arrangement of FIGS. 2a and 3a, it can be seen that the flow gain through the restrictor is constant except as cut-off.

For a low flow gain with a linear characteristic, the restrictors shown in FIG. 4a may be used. With this arrangement, restrictor flow shown in FIG. 4b as ordinate vs. piston motion (abscissa) is at a maximum at null position, and decreases substantially linearly to zero rather slowly with piston motion. It will be noted from FIG. 4c that the pressure differential ($C_1-C_2$ as ordinate vs. input signal as abscissa) curve has the same general shape as in FIGS. 2c and 3c, although the slope is not so steep.

Smoother switching from closed to open functions of grooves 30 and 31 might be had by changing the slope of these grooves to provide for less abrupt change in pressure as the piston is moved. As an example only, this may be accomplished by slight tapering of the edge of the groove or notching of the edge of the groove.

Except for the arrangement of FIG. 4a, where the restrictor is part of the piston and sleeve, the restrictor can be placed in some accessible location for convenient external adjustability. With the arrangement of FIG. 4a, with small input signals and small piston motion, the hydraulic circuit is open to flow across the restrictor. As a result, there is a lower adjustable pressure differential across the restrictor, giving softer actuator control. As flow increases, the pressure differential builds up for positive control. Because the restrictor can be adjusted, control pressures can be set for any desired input level.

By selection of the position and shape of the switching grooves 30 and 31 in piston 21, the pressure gain characteristic is determined. For example, using grooves such as shown in FIG. 4a, for small input signals and small piston motion, there is a lower pressure differential across the restrictor.

While we have herein shown and described various forms of our invention and the best mode presently contemplated by us for carrying out our invention, it should be understood that modifications and changes may be made without departing from the spirit and scope of our invention.

We claim:
1. In a hydraulic servo valve system, in combination, a pilot hydraulic amplifier in a chamber containing fluid, pilot return line means from said amplifier chamber, a control piston in a piston chamber, a pair of load ports communicating with said piston chamber, main supply and return lines connected to said piston chamber, fluid supply lines connecting points on said amplifier chamber to opposite ends of said piston chamber to cause said piston to selectively connect said load ports to a pressure source when there is an input signal to said pilot amplifier, means for sensing load pressure, and means for applying said load pressure to said pilot return line means to modify the pressure therein.

2. In a hydraulic servo valve system, in combination, a pilot hydraulic amplifier in a chamber containing fluid, pilot return line means from said amplifier chamber, a control piston in a piston chamber, a pair of load ports communicating with said piston chamber, fluid supply lines connecting points on said amplifier chamber to opposite ends of said piston chamber, and means for varying the differential pressure on said piston for a given input signal to provide desired piston motion to selectively connect said load ports to a pressure source regardless of external load changes, means for sensing load pressure, and means for applying said load pressure to said pilot return line means to modify the pressure therein.

3. In a hydraulic servo valve system, in combination, a pilot hydraulic amplifier in a chamber containing fluid, a control piston in a piston chamber, a pair of load ports communicating with said piston chamber, fluid supply lines from points on said amplifier chamber to opposite ends of said piston chamber to cause said piston to selectively connect said load ports to a pressure source when there is an input signal to said pilot amplifier, a pair of load conduits, and means for directly connecting said load conduits through a restrictor when, and only when, there is an input signal to said pilot amplifier.

4. The combination claimed in claim 3 having a pair of frequency response adjusting restrictor elements interposed in said fluid supply lines respectively.

5. In a hydraulic servo valve system, in combination, a pilot hydraulic amplifier in a chamber containing fluid, a control piston in a piston chamber, a pair of load conduits communicating with said piston chamber, fluid supply lines from points on said amplifier chamber to opposite ends of said piston chamber to cause said piston to selectively connect said load conduits to a pressure source when there is an input signal to said pilot amplifier, a pair of load conduits leading from said piston chamber, a connecting line between said load conduits, said line containing a flow restrictor, and means for closing said connecting line when said control piston is in neutral position.

6. The combination claimed in claim 1 having an accumulator connected between said pilot return line means and the main return line.

7. In a hydraulic servo valve system, in combination, a pilot hydraulic amplifier comprising a pair of jets and a flapper in a first chamber containing fluid, a pilot return line from said chamber, a control piston in a piston chamber, a pair of load ports communicating with said piston chamber, fluid supply lines connecting points upstream of said jets to opposite ends of said piston chamber to cause said piston to selectively connect said load ports to a pressure source when there is an input signal to said pilot amplifier, main supply and return lines connected to said piston chamber, and a connection from said pilot return line to said main return line for null position of said flapper, said connection including means for restricting leakage from said first chamber.

8. In a hydraulic servo valve system, in combination, a pilot hydraulic amplifier in a first chamber containing fluid, said amplifier including a flapper, a control piston in a piston chamber, a pair of load ports communicating with said piston chamber, fluid supply lines connecting points on said amplifier chamber to opposite ends of said piston chamber to cause said piston to selectively connect said load ports to a pressure source when there is an input signal to said pilot amplifier, main supply and return lines connected to said piston chamber, said piston having a pair of longitudinally spaced grooves supplied with fluid from a first control port, and conduit means connecting said first control port to a second control port through a restrictor, said grooves being so disposed with respect to said fluid line that for null position of said flapper, said control ports are closed.

9. The combination claimed in claim 8, in which said control ports are connected through said grooves for axial movement of said piston in either direction.

10. In a hydraulic servo valve system, in combination, a pilot hydraulic amplifier in a first chamber containing fluid, a control piston in a piston chamber, a pair of load ports communicating with said piston chamber, fluid supply linse connecting points on said amplifier chamber to opposite ends of said piston chamber to cause said piston to selectively connect said load ports to a pressure source when there is an input signal to said pilot amplifier, main supply and return lines connected to said piston chamber, said piston having at least one switching groove supplied with fluid from a first control port, and conduit means connecting said first control port to a second control port through a restrictor, said switching groove being so disposed with respect to said conduit means that fluid is supplied through said groove from said first control port through said restrictor to the second control port for null position of said piston.

11. In a hydraulic servo valve system, in combination, a pilot hydraulic amplifier in a first chamber containing fluid, a control piston in a piston chamber, a pair of load ports communicating with said piston chamber, fluid supply lines connecting points on said amplifier chamber to opposite ends of said piston chamber to cause said piston to selectively connect said load ports to a pressure source when there is an input signal to said pilot amplifier, main supply and return lines connected to said piston chamber, said piston having at least one switching groove supplied with fluid from a first control port, and conduit means connecting said first control port to a second control port for null position of said piston, said piston chamber and groove being so positioned and shaped as to form a restrictor permitting maximum flow therethrough at null position of said piston, and decreasing with increasing departure of said piston from said null position.

12. In a hydraulic servo valve system, in combination, a pilot hydraulic amplifier comprising a pair of jets and a flapper in a chamber containing fluid pilot return line means from said amplifier chamber, a control piston in a piston chamber, a pair of load ports communicating with said piston chamber, fluid supply lines connecting points upstream of said jets to opposite ends of said piston chamber, a main pressure supply line connected to said piston chamber, a main pressure return connected to said piston chamber, said pilot return line means being connected to said piston chamber, said piston being movable in response to an input signal to said pilot amplifier to selectively connect said load ports to said main pressure supply line, means for sensing load pressure, means for applying said load pressure to said pilot return line to modify the pressure therein, and a laminar flow restrictor in at least one of said lines at the junction with said piston chamber.

13. The combination claimed in claim 12 with a laminar flow restrictor in said main pressure supply line at the junction with said piston chamber.

14. The combination claimed in claim 12 with a laminar flow restrictor in said pilot return pressure line at the junction with said piston chamber.

15. The combination claimed in claim 13 with a laminar flow restrictor in said main pressure return line at the junction with said piston chamber.

16. The combination claimed in claim 12 in which said restrictor is provided with a plurality of relatively long openings of uniform or graduated diameter.

17. The combination claimed in claim 12 in which said restrictor is in the form of a fluted insert.

References Cited

UNITED STATES PATENTS

| | | | |
|---|---|---|---|
| 3,012,575 | 12/1961 | Woody et al. | 137—625.62 |
| 3,071,001 | 1/1963 | Goldsmith | 138—40 X |
| 3,095,906 | 7/1963 | Kolm | 137—625.62 |
| 3,211,063 | 10/1965 | Seamone | 137—85 X |

FOREIGN PATENTS 706,195   3/1954   Great Britain.

M. CARY NELSON, *Primary Examiner.*

MARTIN P. SCHWADRON, *Examiner.*

UNITED STATES PATENT OFFICE
CERTIFICATE OF CORRECTION

Patent No. 3,381,698                      May 7, 1968

Paul F. Hayner et al.

It is certified that error appears in the above identified patent and that said Letters Patent are hereby corrected as shown below:

Column 2, line 19, after "flow" insert -- , and positive control by increase of pressure differential as flow --. Column 8, line 32, "applying said load pressure to said pilot return line to" should read -- applying said load pressure to said pilot return line means to --.

Signed and sealed this 16th day of December 1969.

(SEAL)
Attest:

Edward M. Fletcher, Jr.                    WILLIAM E. SCHUYLER, JR.
Attesting Officer                             Commissioner of Patents